(12) United States Patent
Shah et al.

(10) Patent No.: US 7,039,921 B2
(45) Date of Patent: May 2, 2006

(54) METHODS AND APPARATUS IN A LOGGING SYSTEM FOR THE TRACKING OF TASKS SOLELY BASED ON FUNCTION FOR DATA ANALYSIS

(75) Inventors: Rajeeta Lalji Shah, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 09/895,979

(22) Filed: Jun. 29, 2001

(65) Prior Publication Data

US 2003/0005021 A1 Jan. 2, 2003

(51) Int. Cl.
*G06F 9/46* (2006.01)

(52) U.S. Cl. .................. 719/318; 718/100; 709/224
(58) Field of Classification Search ............... 718/101, 718/100; 709/224; 379/219; 719/318
See application file for complete search history.

(56) References Cited

U.S. PATENT DOCUMENTS

| 5,321,837 | A | * | 6/1994 | Daniel et al. .................. 707/4 |
| 5,949,415 | A | * | 9/1999 | Lin et al. ..................... 345/740 |
| 6,094,679 | A | * | 7/2000 | Teng et al. ................ 709/220 |
| 6,185,288 | B1 | * | 2/2001 | Wong ......................... 379/219 |
| 6,470,388 | B1 | * | 10/2002 | Niemi et al. ............... 709/224 |
| 6,820,261 | B1 | * | 11/2004 | Bloch ......................... 718/100 |

* cited by examiner

*Primary Examiner*—Meng-Al T. An
*Assistant Examiner*—Camquy Truong
(74) *Attorney, Agent, or Firm*—Duke W. Yee; Jeffrey S. LaBaw; Gerald H. Glanzman

(57) ABSTRACT

A method, system, and computer program product for the creation and logging of a taskID is provided. In one embodiment, a component initiates a task and requests a task identification (TaskID) from a log task manager. The taskID follows this task (which may flow across multiple components or ORBs) until completion. The TaskID is passed in the thread context in local methods and in the message context in remote method invocations. The taskID is then logged with message and trace data from each of the components through which the task flows that generate a trace or message log.

22 Claims, 3 Drawing Sheets

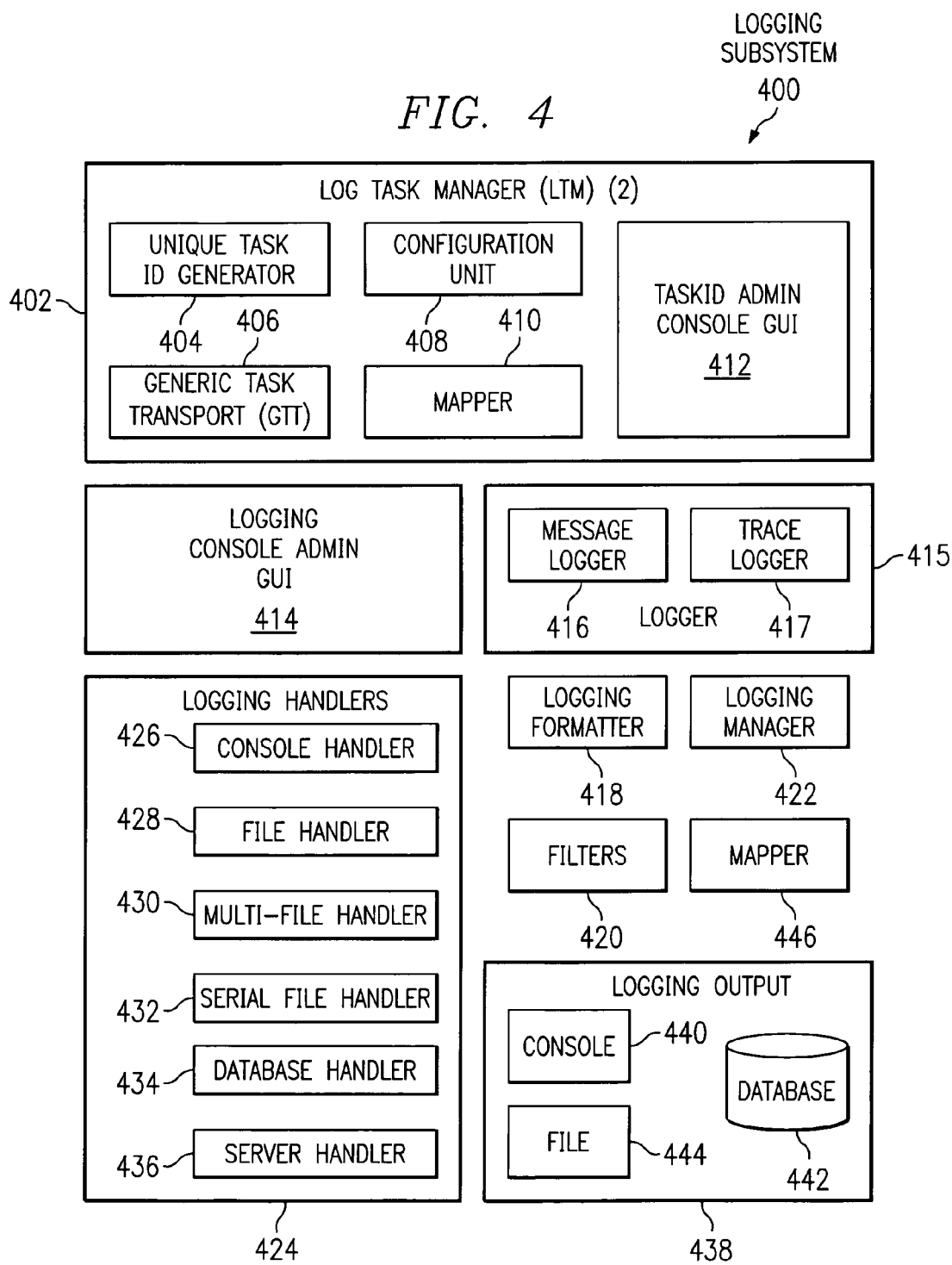

METHODS AND APPARATUS IN A LOGGING SYSTEM FOR THE TRACKING OF TASKS SOLELY BASED ON FUNCTION FOR DATA ANALYSIS

CROSS REFERENCE TO RELATED APPLICATIONS

The present application is related to co-pending U.S. patent application Ser. No. 09/891,584 entitled "METHOD AND APPARATUS FOR DYNAMIC CONFIGURABLE LOGGING OF ACTIVITIES IN A DISTRIBUTED COMPUTING SYSTEM", to co-pending U.S. patent application Ser. No. 09/895,116 entitled "METHOD AND APPARATUS IN INFORMATION MANAGEMENT SYSTEM PROVIDING ADDING DATA AND BOOKMARKS TO EXISTING INFORMATION LOGGED", to co-pending U.S. patent application Ser. No. 09/895,229 entitled "METHODS AND APPARATUS IN DISTRIBUTED REMOTE LOGGING SYSTEM FOR REMOTE ADHOC DATA ANALYSIS CUSTOMIZED WITH MULTILEVEL HIERARCHICAL LOGGER TREE", to co-pending U.S. patent application Ser. No. 09/895,459 entitled "METHODS AND APPARATUS IN A LOGGING SYSTEM FOR THE ADAPTIVE HANDLER REPLACEMENT IN ORDER TO RECEIVE PRE-BOOT INFORMATION" filed even date herewith. The content of the above applications are hereby incorporated herein by reference for all purposes.

BACKGROUND OF THE INVENTION

1. Technical Field

The present invention relates generally to computer network environments, and more specifically to logging services in distributed, multilevel architectures.

2. Description of Related Art

Computers have come to epitomize modern life. Today, computers are used for much more than simply computing. For example, banking transactions are often conducted through automated teller machines (ATMs) connected via networks to central processing centers that keep track of transactions while computerized telephone switching systems manage the millions of calls generated each day. Furthermore, computers are integral to both peoples personal life as well as to their business life.

As computers became more widespread in the workplace, new ways to harness their potential developed. Thus, with increasing use of computers for tasks other than simple computing has come an increase in complexity. Furthermore, as computers are increasingly networked together to provide even more functionality, that complexity is increased exponentially. To keep these networked computers operating and, therefore, ensure that ATM transactions, telephone calls, and business continue to operate smoothly, requires the work of administrators to monitor the systems and correct errors as they occur.

One tool that aids administrators in keeping networks operational is logging. Logging is the process of recording system events so that those actions can be reviewed later. Thus, if an error occurs, that error may be logged with other information to allow an administrator to discover the source of the problem and correct it. However, in networked systems, things occurring in various components of the system must be correlated to determine the ultimate cause of a problem.

Today data correlation is done using time-stamp to find related tasks flow with a single log. This works OK when the number of machine is small, the number of tasks is low or the interrelationship between tasks is low (messages look different to user). However, in installation with a thousand or more machines with at least that many administrators, a simple time stamp is not good enough for human data correlation. In addition, remote proxy calls (tasks that use components in two or more different Object Request Broker (ORB) machines) make this correlation more difficult because a single transaction can span numerous machines.

Prior attempts to solve this problem have used the idea of using a thread identification (ID) in a native operating system (OS) to track a program's execution. Such prior attempts include a 1997 International Business Machine distributed thread mechanism and method. This system was thread based and related to ensuring that for a distributed transaction, all portions are completed which solved the problem of allocating threads and tracking all operations completed between client and server systems. Another prior attempt is described in U.S. Pat. No. 6,205,465 entitled "Component extensible parallel execution of multiple threads assembled from program components specified with partial inter-component sequence information" which used parallel processing enablement to schedule execution of multiple threads on separate processors. These methods work fine in a single thread execution model, but become unmanageable in multiple threads across multiple machines. In the case of single machines, it is known who spawned the additional threads, whereas in the remote ORB the origin of the task is unknown. Therefore, it would be desirable to have an improved method and system for logging events in large networks.

SUMMARY OF THE INVENTION

The present invention provides a method, system, and computer program product for the creation and logging of a taskID. In one embodiment, a component initiates a task and requests a task identification (TaskID) from a log task manager. The taskID follows this task (which may flow across multiple components or ORBs) until completion. The TaskID is passed in the thread context in local methods and in the message context in remote method invocations. The taskID is then logged with message and trace data from each of the components through which the task flows that generate a trace or message log.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a block diagram of a logging subsystem in accordance with the present invention;

DETAILED DESCRIPTION OF THE PREFERRED EMBODIMENT

Figure 1:
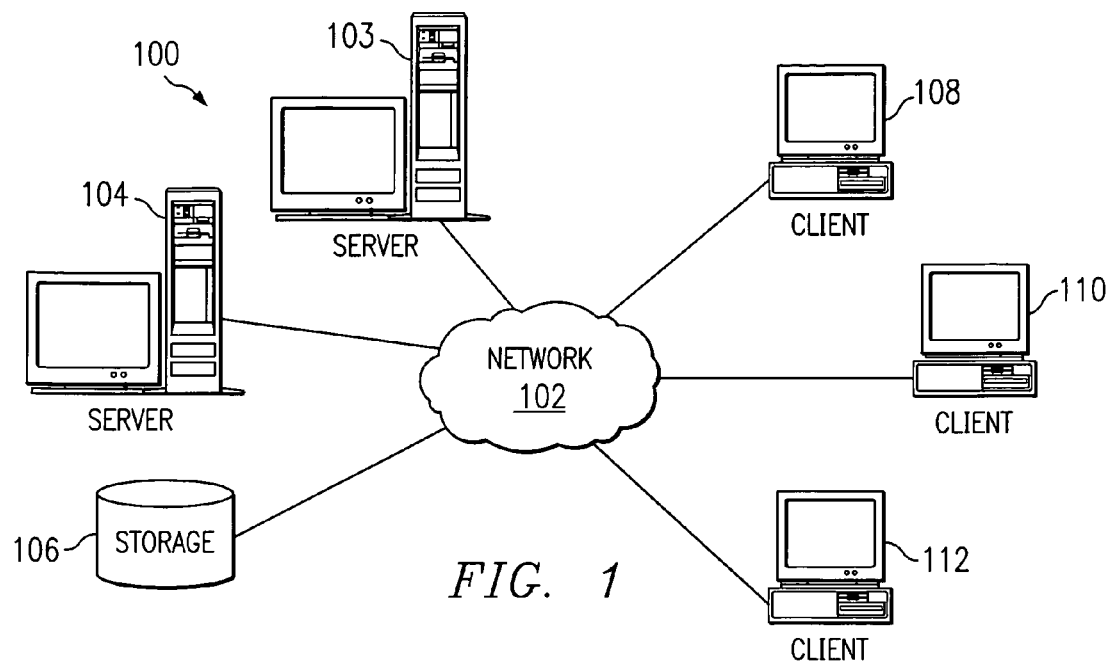
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a plurality of servers 103–104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to servers 103–104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
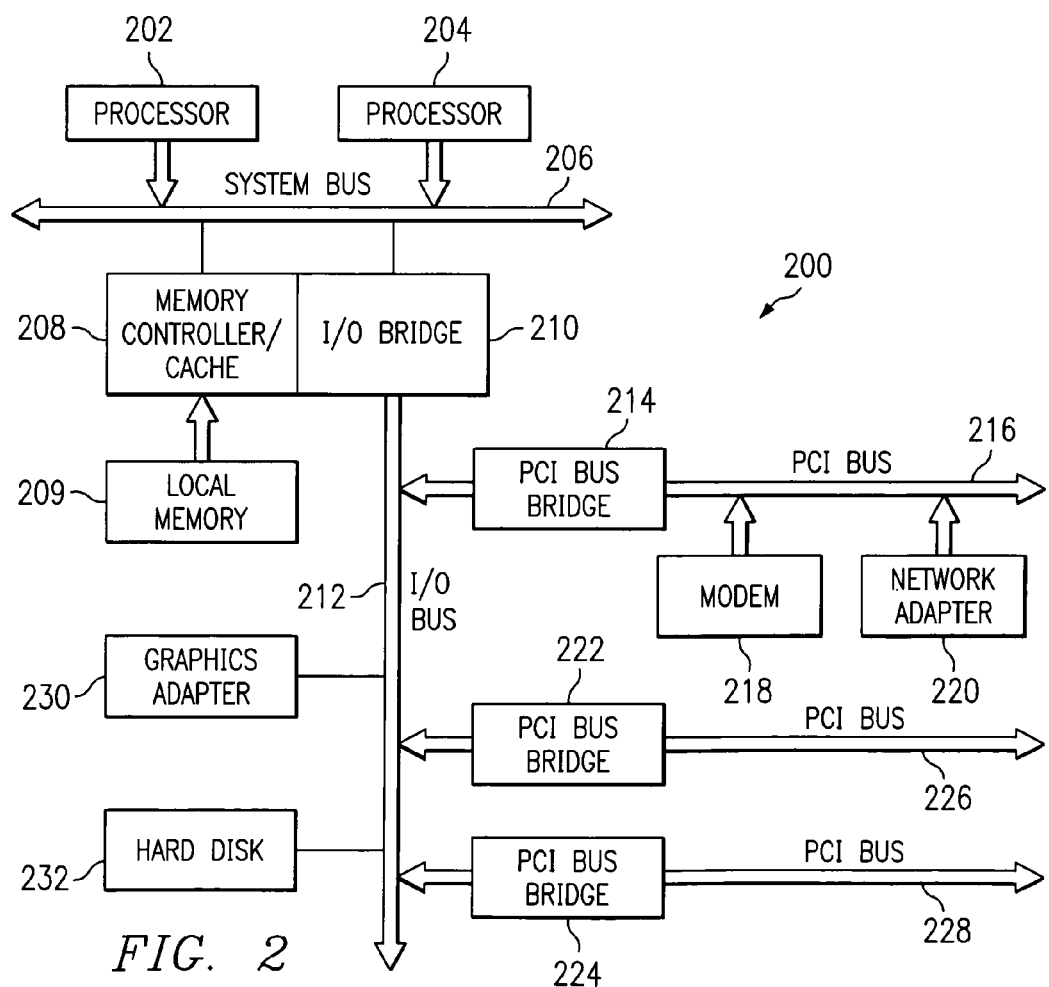
FIG. 2 depicts a block diagram of a data processing system that may be implemented as a server in accordance with a preferred embodiment of the present invention.

Referring to FIG. 2, a block diagram of a data processing system that may be implemented as a server, such as servers 103–104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
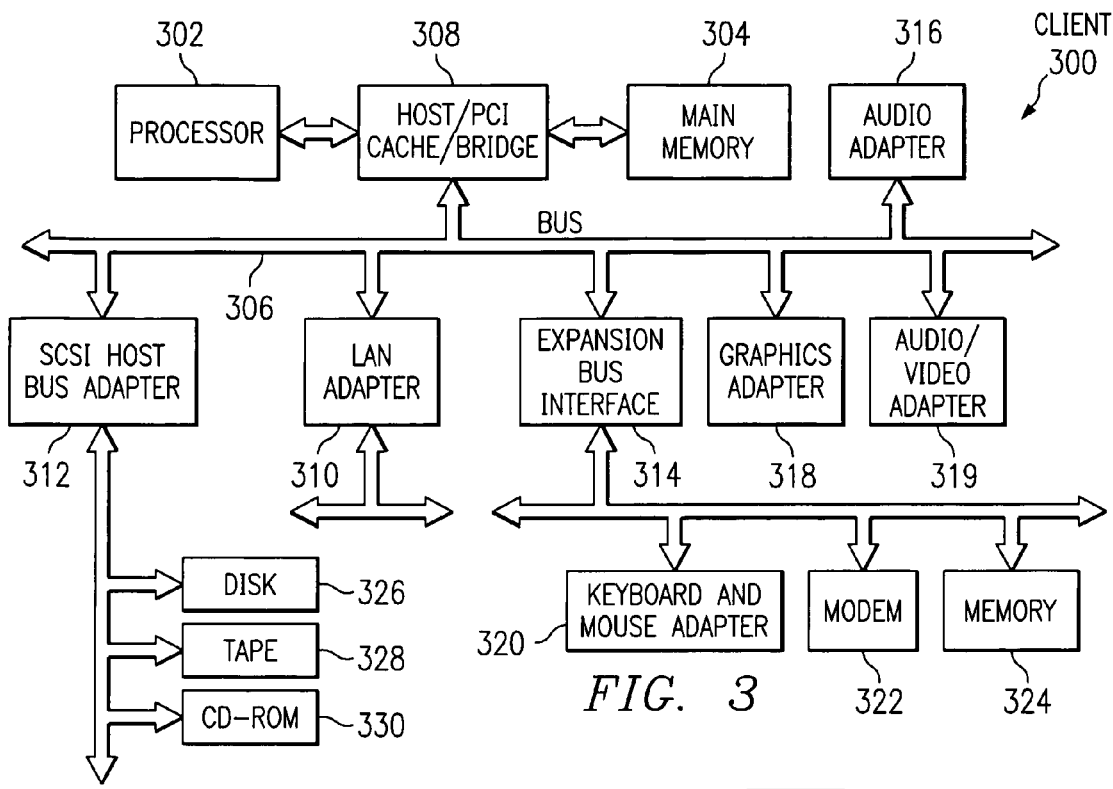
FIG. 3 depicts a block diagram illustrating a data processing system is depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a logging system with distributed, multilevel architecture which allows remote control of logging elements. The present invention also allows the logging system to be used standalone or in a distributed environment. The logging system allows a system to produce large amounts of data for local consumption, as opposed to a small amount of data for storage in a central remote repository. Dual output is easily configured for an administrator wishing to see logs on the console, in multiple files and in a database for future queries.

Furthermore, the present invention provides for the creation and logging of a taskID. This allows a component to initiate a task to use a task identification (TaskID) which follows this task (which may flow across multiple components or ORBs) until completion. The TaskID is passed in the thread context in local methods and in the message context in remote method invocations. The taskID is then logged with message and trace data from each of the components through which the task flows that generate a trace or message log.

With reference now to FIG. 4, a block diagram of a logging subsystem is depicted in accordance with the present invention. The logging subsystem 400 uses several objects to record system events. These objects include loggers 415, logging handlers 424, logging filters 420 (also referred to as masks), and logging formatters 418. Log subsystem 400 also includes a Log Task manger (LTM) 402, a logging console administrator graphical user interface (GUI) 414, a logging manager 422, logging output 438, and mapper 446.

Loggers 415 are software objects that record events that occur while a component is operating. The Logging subsystem 400 supports two types of loggers 415: message loggers 416 and trace Loggers 417. Message loggers 416 are used to record textual messages from a component. These messages are internationalized for individual locales. Trace loggers 417 are used to capture information about the operating environment when component code fails to operate as intended. Support personnel use the information captured by trace loggers 417 to trace a problem to its source or to determine why an error occurred. Generally, this information is not enabled by default. Because trace messages are intended for support personnel, they are generally written to a file that can be viewed during a postmortem Examination.

Mapper 446 maps (or associates) logs associated with a given taskID to a given user detectable action, such as, for example, the depressing of a particular button. Thus, if the logging information is presented to the user, it can be presented with a user friendly description associating logging information with actions. Therefore, a user can view logging information with a correlation to an event that is meaningful to the user rather than with a correlation to a taskID that may have no meaning to the user. The taskID can be used to filter logging data (both message and trace logging data) to obtain all messages associated with a task and present the logging data to a user such that all logging data associated with a particular task is available to the user regardless of the component, ORB, or node that generated the data.

Handlers 424 are software objects that direct messages recorded by a logger to a logging output 438 destination. Messages can be directed to a file 444, a database 442, a console screen 440, or to other destinations. One associates handlers 424 with loggers 415 to send information recorded by a logger 415 to the desired destination. The present invention provides the configuration definitions for the following types of handlers:

Console Handler 426 writes log records to a console.
File Handler 428 writes log records to a file.
Multifile Handler 430 writes log records to a rotating set of log files.
Serial File Handler 432 writes log records to files as serialized objects.
Database Handler 434 writes log records to a database.
Server Handler 436 sends log records in batch mode to a remote logging server for processing.

Filters 420 can be applied to loggers, to handlers 424, or to both loggers and handlers. When applied to a logger, the filter determines which types of message and trace records the logger 415 processes. When applied to a handler 424, the filter 420 determines which types of message and trace records the handler 424 sends to a destination. Filters 420 work by comparing a log record type against a set of criteria, or a query, contained within the filter.

Formatters 418 are software objects used to format the output of information contained in log records. In general, formatters 418 can be used to tailor things like date and time stamps to local conventions. A single formatter 418 can be used by multiple handlers 424. Having numerous loggers 416, handlers 424, filters 420, and formatters 418 can cause an undue amount of logging administration to perform. To reduce the administration burden, one can create "groups".

A group contains loggers, handlers, filters, or formatters that have common properties. By creating groups, a newly created logger, handler, filter, or formatter with unset properties can inherit values for those properties from the group. If a logger, handler, filter, or formatter belongs to a group and its properties are updated, all other loggers, handlers, filters or formatters in that group will also have that property updated. This eliminates the need for manually updating individual logger, handler, filter, or formatter properties.

The logging manager 422 provides an interface to Object Request Brokers (ORBs) as well as configuration and other DKS services. (An ORB is software that handles the communication of messages from a requesting program {client} to the object as well as any return values from the object back to the calling program.) The logging console Graphical User Interface (GUI) provides an interface to allow an administrator to provide configuration information as well as to output messages to the administrator. The log task manager (LTM) 402 includes a unique task ID generator ORB identification (ID) 404, a generic task transport (GTT) 406, a configuration unit 408, a mapper 410, and a taskID console 412.

Figure 5:
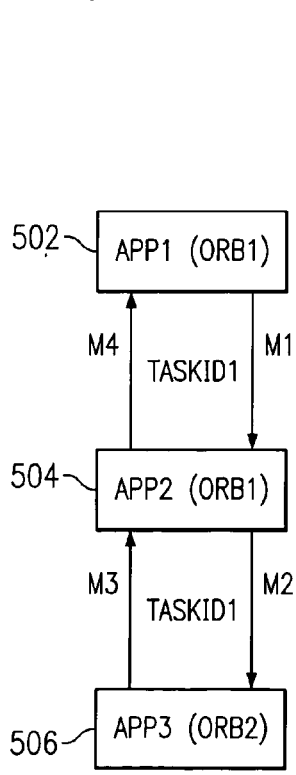
FIG. 5 depicts a block diagram illustrating the writing of a message using task IDs in accordance with the present invention.

The function of LTM 402 is best explained by example, thus referring now to FIG. 5, a block diagram illustrating the writing of a message using task IDs is depicted in accordance with the present invention. In the present example, three applications 502–506 are running in two ORBs (ORB1 and ORB2). These applications and ORBs may be on a single data processing system or, more typically, may be on two or more different data processing systems networked together. Application 1 (App1) 502, as depicted, is executing inside ORB1 and decides to group several actions, events into a single task. However, in other embodiments, the App1 502 may be executing outside an ORB. The App1 502 may be, for example, Command Line Interface (CLI) or GUI components.

App1 502 gets a TaskID from the UniqueTaskID Generator 404. The unique TaskID generator 404 generates a unique number, for example 0001, for the TaskID for app1 502. The unique TaskID generator 404 then determines whether the ORB is running. If yes, then the unique TaskID generator 404 retrieves the ID of ORB and combines the orbId and the TaskID. For example, if the ORB id is 3.7b6c076cfe890732.1.76a0d998c6a4863f, then the TaskID is 0001.3.7b6c076cfe890732.1.76a0d998c6a4863f. If the ORB is not running, then the unique Task ID generator 404 combines 0.0.0.0 and taskID to specify orb is not running. Thus, the task ID for app1 502 in this case is 0001.0.0.0.0. The unique TaskID generator then returns the taskID back to App1 502.

App1 502 then informs LTM 402 that the task is starting with a setTaskID method. This method attaches the taskId to the TaskIDTransport mechanism. In the present example, LocalThreadContext is used for a local execution of a thread in the Java object oriented programming language. This generic transport mechanism may be, for example, over the wire (remote proxy calls), specialized port hardware (to a debugger hardware analyzer), or through the use of some other protocol used for transporting data from point to point (e.g. http, PPPoE). App1 502 then gets a reference to LTM's Generic Task Transport (GTT) 406. GTT 406 transfers TaskID from the thread context to the message context and back implicitly. App1 502 then calls GTT's 406 setTaskID ( ) method with the original taskID (taskID1=123). GTT 406 attaches taskID to the Transport. In the present case, the taskID is attached to the LocalThreadTransport. The LocalThreadTransport extends the InheritableThreadLocal and places the TaskID on the local thread.

Appl 502 calls M1 API of App2 504. Since App2 504 resides on a remote ORB, remote method invocation (RMI) is invoked by the ORB subsytem. Data that is to be sent over the wire is serialized into a byte language. The taskID is also serialized since it is part of the thread variables M1. App2 504 calls M2 App3 506 and sends with the call M2 the taskID1 which was first obtained by App1 502. App3 506 runs in a different ORB from App2 504. App3 506 completes the task and returns M3 results to App2 504 including in the return M3 the taskID1.

In this example, App2 504 throws M4 an exception due to an error. Appl 502 catches this exception and wishes to log a message. Thus, Appl 502 gets messageLogger 416 from LoggingManager 422. Based on configuration the Logging Manger 422 creates the correct handler:

if (console=true) create Console Handler 426
    if (file=true) create File Handler 428
    if (multifile=true) create Multifile Handler 430
    if (serialFile=true) create Serial File Handler 432
    if (Database=true) create DatabaseHandler 434
    if (server=true) creates Server Handler 436

App1 502 formats the data it wants to be logged and calls the logo method of the Message Logger 416. MessageLogger 416 calls the LTM 402 to add the taskID information to the message. LTM 402 gets TaskID from the thread and returns the taskID to MessageLogger 416. The MessageLogger 416 then creates a log record which includes this TaskID. MessageLogger 416 using preconfigured MessageHandler 424, asks MessageHandler 424 to save this log record. MessageHandler 424 using the preconfigured MessageFilter 420, determines what data should be saved. The taskID is always saved.

The logging mechanism of the present invention allows for greater granularity in associating events to be logged than does prior art methods using the threadID since several different sets of tasks all of which may be performed on the same thread, may have different taskIDS. Thus, allowing the tracking of separately grouped events that would be grouped together if the threadID were used. The only requirement is that the tasks be serial tasks.

Figure 6:
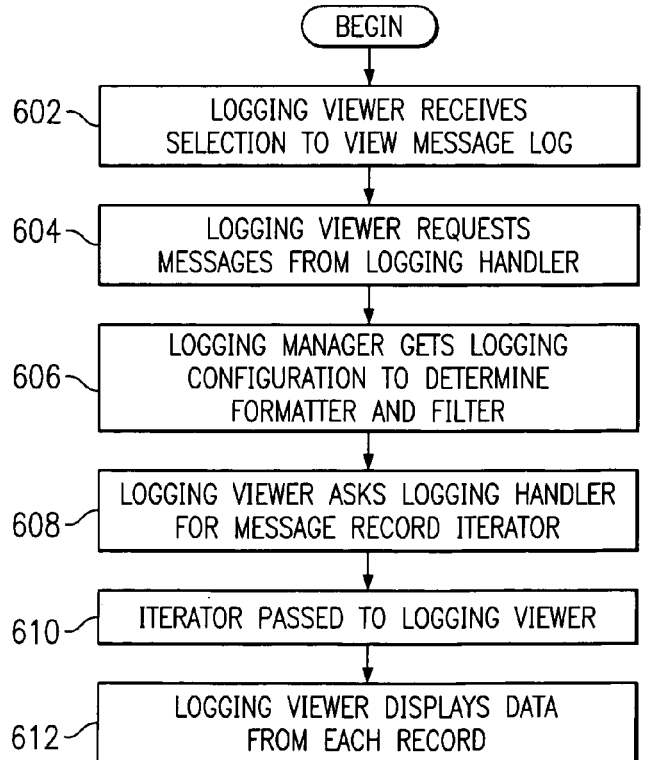
FIG. 6 depicts a process flow and program function illustrating a method of reading a message with taskID in accordance with the present invention.

With reference now to FIG. 6, a process flow and program function illustrating a method of reading a message with taskID such as generated by the example in FIG. 5 is depicted in accordance with the present invention. To begin an administrator chooses to view a message log in a logging viewer 414 (step 602). The logging viewer 414 requests messages from the logging handler 424 (step 604). The logging manager 422 gets the logging configuration to determine the correct formatter and filter as well as other items (step 606). The logging viewer 414 then asks the logging handler 424 for the message record iterator (step 608). The iterator is passed to the logging viewer 414 (step 610) which then displays the data from each record to the administrator (step 612).

Some advantages of the present invention include that it is not limited to tracking of RMI application methods which use remote proxies. Such a requirement is too restrictive since many method calls are not using CORBA or Voyager ORB to ORB code, but rather components that are local and require no ORB communication which are expensive. Additionally, the present invention provides ORB or non-ORB applications with the ability to track tasks via a distributed logging subsystem which can be run inside or outside of an ORB.

The present invention includes automatic task based id generation for tracking tasks across multiple threads. Such tracking does not necessarily depend on thread implementation. However, the described embodiment uses the thread mechanism as a transport for the taskID. The present invention enables an application to decide which events are related using this taskID. Procedural implementations (highly serialized native code) with few threads or object oriented implementations with many threads can both benefit from the present invention. A middle ground between the amount of data correlation possible is defined by application rather than by attempting to track all threads which is an expensive performance hit (too much data correlation) or than by tracking none which results in too little correlation (highly serialized function).

The present invention enables data correlation. It allows for the ability to provide filters to the user representing tasks as executed across applications, services, components, ORBs thus presenting a smaller subset of logging data (trace or message) to the user Administrator. Furthermore, extraction of meaningful interrelated data from log files residing all distributed machines with the same name is provided as well as extracting meaningful, interrelated data from many rows of data in a single or multilevel logging database.

Furthermore, the present invention enables data stored in different loggers (Trace versus Message) to be related based on the application's definition. Furthermore, in a preferred implementation, the present invention is implemented at JVM/application level rather than as OS specific native code used in a CORBA thread.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for tracking tasks in a logging system, the method comprising:
    receiving, at log task manager, a request associated with an application program to assign a unique task identification to a set of related events having a relationship with a task identified by the application program to be tracked, wherein the relationship between the set of related events and the task is established by the application program;
    generating, at a log task manager, the unique task identification;
    attaching the unique task identification to a transport mechanism that passes information between components and utilizes a message context;
    combining the unique task identification with logging information generated by one or more of the components to correlate logging information entries associated with related events; and
    filtering a plurality of logging information entries based on the unique task identification to produce a set of correlated logging information entries associated with the related events for presentation to a user.

2. The method as recited in claim 1, wherein attaching the unique task identification to the transport mechanism comprises attaching the unique task identification to a local thread transport.

3. The method as recited in claim 2, further comprising:
    at the local thread transport, extending the inheritable thread local; and
    at the local thread transport, placing the task identification on a local thread.

4. The method as recited in claim 1, wherein the transport mechanism utilizes a point to point protocol.

5. The method as recited in claim 4, wherein the point to point protocol is a hypertext transfer protocol.

6. The method as recited in claim 1, wherein the transport mechanism utilizes the message context for transporting data remotely.

7. The method as recited in claim 1, further comprising:
    mapping a taskID to a corresponding action, wherein the corresponding action provides a user friendly description of the related events; and
    presenting logging information to a user based on the corresponding action.

8. A method for tracking tasks in a logging system, the method comprising:
    receiving, at long task manager, a request associated with an application program to assign a unique task identification to a set of related events having a relationship with a task identified by the application program to be tracked, wherein the relationship between the set of related events and the task is established by the application program;
    generating, at a log task manager, the unique task identification;
    attaching the unique task identification to a transport mechanism that passes information between components, wherein the transport mechanism utilizes a remote proxy call;
    combining the unique task identification with logging information generated by one or more of the components to correlate logging information entries associated with related events; and
    filtering a plurality of logging information entries based on the unique task identification to produce a set of correlated logging information entries associated with the related events for presentation to a user.

9. A method for tracking tasks in a logging system, the method comprising:
    receiving, at log task manager, a request associated with an application program to assign a unique task identification to a set of related events having a relationship with a task identified by the application program to be tracked, wherein the relationship between the set of related events and the task is established by the application program;
    generating, at a log task manager, the unique task identification;
    attaching the unique task identification to a transport mechanism that passes information between components, wherein the transport mechanism utilizes port hardware;
    combining the unique task identification with logging information generated by one or more of the components to correlate logging information entries associated with related events; and
    filtering a plurality of logging information entries based on the unique task identification to produce a set of correlated logging information entries associated with the related events for presentation to a user.

10. A method for tracking tasks in a logging system, the method comprising:
    receiving, at log task manager, a request associated with an application program to assign a unique task identification to a set of related events having a relationship with a task identified by the application program to be tracked, wherein the relationship between the set of related events and the task is established by the application program;

generating, at a log task manager, the unique task identification;

attaching the unique task identification to a transport mechanism that passes information between components;

combining the unique task identification with logging information generated by one or more of the components to correlate logging information entries associated with related events;

filtering a plurality of logging information entries based on the unique task identification to produce a set of correlated logging information entries associated with the related events for presentation to a user; and wherein the unique task identification is a first unique task identification, the related events are first related serial events and further comprising:

receiving, at the log task manager, a request from the application program for a second unique task identification assigned to second related serial events identified by the application program; and attaching the second unique task identification to the transport mechanism.

11. A computer program product in a computer readable media for use in a data processing system for tracking tasks in a logging system, the computer program product comprising:

first instructions for receiving, at log task manager, a request associated with an application program to assign a unique task identification to a set of related events having a relationship with a task identified by the application program to be tracked, wherein the relationship between the set of related events and the task is established by the application program;

second instructions for generating, at a log task manager, the unique task identification;

third instructions for attaching the unique task identification to a transport mechanism that passes information between components and utilizes a message context;

fourth instructions for combining the unique task identification with logging information generated by one or more of the components to correlate logging information entries associated with related events; and fifth instructions for filtering a plurality of logging information entries based on the unique task identification to produce a set of correlated logging information entries associated with the related events for presentation to a user.

12. The computer program product as recited in claim 11, wherein attaching the unique task identification to the transport mechanism comprises attaching the unique task identification to a local thread transport.

13. The computer program product as recited in claim 12, further comprising:

sixth instructions, at the local thread transport, for extending the inheritable thread local; and seventh instruction, at the local thread transport, for placing the task identification on a local thread.

14. The computer program product as recited in claim 11, wherein the transport mechanism utilizes a remote proxy call.

15. The computer program product as recited in claim 11, wherein the transport mechanism utilizes port hardware.

16. The computer program product as recited in claim 11, wherein the transport mechanism utilizes a point to point protocol.

17. The computer program product as recited in claim 16, wherein the point to point protocol is a hypertext transfer protocol.

18. The computer program product as recited in claim 11, wherein the transport mechanism utilizes the message context for transporting data remotely.

19. The computer program product as recited in claim 11, wherein the unique task identification is a first unique task identification, the related events are first related serial events and further comprising:

sixth instructions for receiving, at the log task manager, a request from the application program for a second unique task identification assigned to second related serial events identified by the application program; and seventh instructions for attaching the second unique task identification to the transport mechanism.

20. The computer program product as recited in claim 11, further comprising:

sixth instructions for mapping a taskID to a corresponding action, wherein the corresponding action provides a user friendly description of the related events; and seventh instructions for presenting logging information to a user based on the corresponding action.

21. A computer system for tracking tasks in a logging system, the computer system comprising:

a logging manager which receives request associated with an application program to assign a unique task identification to a set of related events having a relationship with a task identified by the application program to be tracked, wherein the relationship between the set of related events and the task is established by the application program;

a unique taskID generator which generates the unique task identification;

a task transport unit which attaches the unique task identification to a transport mechanism that passes information between components and utilizes a message context;

a logger which combining the unique task identification with logging information generated by one or more of the components to correlate logging information entries associated with related events; and a filter which filters a plurality of logging information entries based on the unique task identification to produce a set of correlated logging information entries associated with the related events for presentation to a user.

22. The computer system as recited in claim 21, further comprising:

a mapper which maps a taskID to a corresponding action, wherein the corresponding action provides a user friendly description of the related events; and a presentation unit which presents logging information to a user based on the corresponding action.

* * * * *